United States Patent
van den Elsen et al.

(10) Patent No.: US 10,877,969 B2
(45) Date of Patent: Dec. 29, 2020

(54) AUGMENTING STRUCTURED DATA

(71) Applicant: INTERNATIONAL BUSINESS MACHINES CORPORATION, Armonk, NY (US)

(72) Inventors: Jelle A. G. van den Elsen, Weert (NL); Franciscus J. J. van Ham, Geldrop (NL)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 15/923,563

(22) Filed: Mar. 16, 2018

(65) Prior Publication Data

US 2019/0286732 A1     Sep. 19, 2019

(51) Int. Cl.
  *G06F 16/30*   (2019.01)
  *G06F 16/2455*   (2019.01)
  *G06K 9/00*   (2006.01)

(52) U.S. Cl.
  CPC ..... *G06F 16/2455* (2019.01); *G06K 9/00597* (2013.01)

(58) Field of Classification Search
  CPC .......................... G06F 16/2455; G06K 9/00597
  See application file for complete search history.

(56) References Cited

U.S. PATENT DOCUMENTS

| | | | |
|---|---|---|---|
| 6,106,119 A | 8/2000 | Edwards | |
| 6,601,021 B2 | 7/2003 | Card et al. | |
| 6,712,468 B1 | 3/2004 | Edwards | |
| 7,029,121 B2 | 4/2006 | Edwards | |
| 2004/0156020 A1* | 8/2004 | Edwards | G06F 3/013 351/209 |
| 2007/0112916 A1* | 5/2007 | Singh | H04W 4/12 709/206 |
| 2012/0203640 A1 | 8/2012 | Karmarkar et al. | |
| 2012/0313949 A1* | 12/2012 | Rope | G06T 11/206 345/440 |
| 2013/0035575 A1* | 2/2013 | Mayou | A61B 5/14532 600/365 |
| 2014/0306882 A1 | 10/2014 | Johansen et al. | |

(Continued)

OTHER PUBLICATIONS

Article entitled "Visualization of Gaze Tracking Data for UX Testing on the Web", by Mora et al., dated Jan. 2014.*

(Continued)

*Primary Examiner* — Mahesh H Dwivedi
(74) *Attorney, Agent, or Firm* — Dmitry Paskalov

(57) ABSTRACT

Disclosed is a method for augmenting structured data, comprising: providing a data store storing structured data comprising a first plurality of data items, each data item having an associated weight. One or more visualizations are displayed, the visualizations comprising visual representations of a subset of the of data items. User eye fixation over the visualizations is tracked and processed to provide processed eye fixation data. Relative amounts of eye fixation each of the visual representations in the visualizations receives is determined using the processed eye fixation data. The data item which is associated with each of the visual representations of the data items is determined. The associated weight corresponding to the data item is modified dependent on the relative amounts of eye fixation.

13 Claims, 8 Drawing Sheets

(56) References Cited

U.S. PATENT DOCUMENTS

| | | | | |
|---|---|---|---|---|
| 2014/0344012 | A1* | 11/2014 | Kamhi | G06F 3/013 |
| | | | | 705/7.29 |
| 2015/0153570 | A1* | 6/2015 | Yamamoto | H04M 1/72563 |
| | | | | 345/184 |
| 2015/0213123 | A1 | 7/2015 | Peters et al. | |
| 2016/0086219 | A1* | 3/2016 | Richardson | G06F 16/9535 |
| | | | | 705/14.53 |
| 2016/0124960 | A1* | 5/2016 | Moser | G06T 11/206 |
| | | | | 707/723 |
| 2017/0031433 | A1* | 2/2017 | Abou Mahmoud | G06F 3/013 |
| 2017/0220106 | A1* | 8/2017 | Tomiyama | B60J 1/02 |
| 2017/0278172 | A1* | 9/2017 | Dey | G06Q 30/0631 |
| 2018/0174060 | A1* | 6/2018 | Velez-Rojas | G06F 3/013 |
| 2019/0346678 | A1* | 11/2019 | Nocham | H04W 4/029 |

OTHER PUBLICATIONS

Mell, "The NIST Definition of Cloud Computing", NIST National Institute of Standards of Technology, US Department of Commerce, Special Publication 800-145, Sep. 2011, 7 pages.

Blascheck et al., "State-of-the-Art of Visualization for Eye Tracking Data", Eurographics Conference on Visualization (EuroVis), 2014 (best date available), STAR—State of the Art Report, pp. 1-20.

Steichen et al., "User-adaptive information visualization: using eye gaze data to infer visualization tasks and user cognitive abilities", Proceedings of the 2013 international conference on Intelligent user interfaces, IUI '13, pp. 317-328, Santa Monica, California, USA, Mar. 19-22, 2013.

Steichen et al., "Seeing how you're looking—Using Real-Time Eye Gaze Data for User-Adaptive Visualization", The 21st Conference on User Modeling, Adaptation and Personalization, UMAP Workshops, 2013, Rome, Italy, Jun. 10-14, 2013, Roma Tre University, pp. 1-4.

Toker et al., "Eye Tracking to Understand User Differences in Visualization Processing with Highlighting Interventions", International Conference on User Modeling, Adaptation, and Personalization, UMAP 2014 (best date available): User Modeling, Adaptation, and Personalization, pp. 219-230, Conference Paper, Part of the Lecture Notes in Computer Science (LNCS) book series, vol. 8538.

\* cited by examiner

| WEIGHT | YEAR | SEAS. | PROD. | SOLD | COST | PROFIT |
|---|---|---|---|---|---|---|
| 2 | 2017 | SPR | A | 375 | 1500 | 375 |
| 4 | 2017 | SPR | B | 150 | 300 | 37.5 |
| 3 | 2017 | SPR | C | 250 | 2000 | 125 |
| 1 | 2017 | SUM | A | 250 | 1000 | 250 |
| 2 | 2017 | SUM | B | 125 | 250 | 31.25 |
| 7 | 2017 | SUM | C | 62.5 | 500 | 31.25 |
| 1 | 2017 | FAL | A | 625 | 2500 | 625 |
| 4 | 2017 | FAL | B | 250 | 500 | 62.5 |
| 3 | 2017 | FAL | C | 125 | 1000 | 62.5 |
| 1 | 2017 | WIN | A | 250 | 1000 | 250 |
| 2 | 2017 | WIN | B | 175 | 350 | 43.75 |
| 7 | 2017 | WIN | C | 312.5 | 2500 | 156.25 |

FIG. 3

AUGMENTING STRUCTURED DATA

BACKGROUND

The present invention relates to augmenting structured data using input from an eye tracker, and more specifically to augmenting structured data with an associated weight indicating "interestingness".

Many systems which allow users to interactively navigate and query structured data rely on data visualization technology to return subsets of all the data in a human friendly matter. However, even with data visualization technology, users need tools to scope their data questions to subsets of all the data. Explicit scoping can happen, for example, by applying filters through user interface components which translate user interface actions into filter definitions. More advanced systems allow specifications of filters by reading a natural language definition and translating that into a query filter definition. Collaborative systems can deduce interesting subsets of all the data by comparing explicit filter definitions from many different users, under the assumption that often requested data subsets are more interesting.

As there is a move to systems that can assist a user in analyzing their data, these systems will require more input on what data is "important" to the user. Historically, systems have captured this "interestingness" by requiring that a user explicitly indicate their interest in a data item, for example, by having the user include it in a filter, or have deduced interestingness from other structured data already present, for example, by only considering the subset of data items associated with products with the highest sales values. Other methods to capture interestingness of an item involve analyzing the entire set of items with statistical algorithms to detect anomalies.

All of these methods rely either on explicit information stored inside the data or explicit actions undertaken by the user. All statistical methods can solely rely on knowledge explicitly captured in the data.

SUMMARY

According to an embodiment of the invention, a computer-implemented method for augmenting structured data comprises: providing a data store, the data store storing structured data, the structured data comprising a first plurality of data items, each of the first plurality of data items having an associated weight; displaying one or more visualizations, the visualizations comprising visual representations of a second plurality of the first plurality of data items; tracking and processing user eye fixation over the one or more visualizations to provide processed eye fixation data; determining, using the processed eye fixation data, relative amounts of eye fixation each of the visual representations in each of the one or more visualizations receives; determining which one of the first plurality of data items is associated with each of the visual representations of the second plurality of the first plurality of data items; and modifying the associated weight corresponding to the one of the first plurality of data items dependent on the relative amounts of eye fixation.

Embodiments of the invention provide an apparatus for augmenting structured data, comprising: a data store which stores structured data, the structured data comprising a first plurality of data items, each of the first plurality of data items having an associated weight; a visualization subsystem displaying one or more visualizations, the visualizations comprising visual representations of a second plurality of the first plurality of data items; a gaze detection component which tracks and processes user eye fixation over the one or more visualizations to provide processed eye fixation data; a gaze analysis component which: determines, using the processed eye fixation data, relative amounts of eye fixation each of the visual representations in each of the one or more visualizations receives; determines which one of the first plurality of data items is associated with each of the visual representations of the second plurality of the first plurality of data items; and modifies the associated weight corresponding to the one of the first plurality of data items dependent on the relative amounts of eye fixation.

Embodiments of the invention also provide a computer program product for augmenting structured data, the computer program product comprising: a computer readable storage medium having program instructions embodied therewith, the program instructions executable by a computer to cause the computer to: provide a data store, the data store storing structured data, the structured data comprising a first plurality of data items, each of the first plurality of data items having an associated weight; display one or more visualizations, the visualizations comprising visual representations of a second plurality of the first plurality of data items; track and process user eye fixation over the one or more visualizations to provide processed eye fixation data; determine, using the processed eye fixation data, relative amounts of eye fixation each of the visual representations in each of the one or more visualizations receives; determine which one of the first plurality of data items is associated with each of the visual representations of the second plurality of the first plurality of data items; and modify the associated weight corresponding to the one of the first plurality of data items dependent on the relative amounts of eye fixation.

BRIEF DESCRIPTION OF THE DRAWINGS

Preferred embodiments of the present invention will now be described in more detail, by way of example only, with reference to the accompanying drawings, in which:

FIG. 3 shows the structured data of FIG. 1;

DETAILED DESCRIPTION

Figure 1:
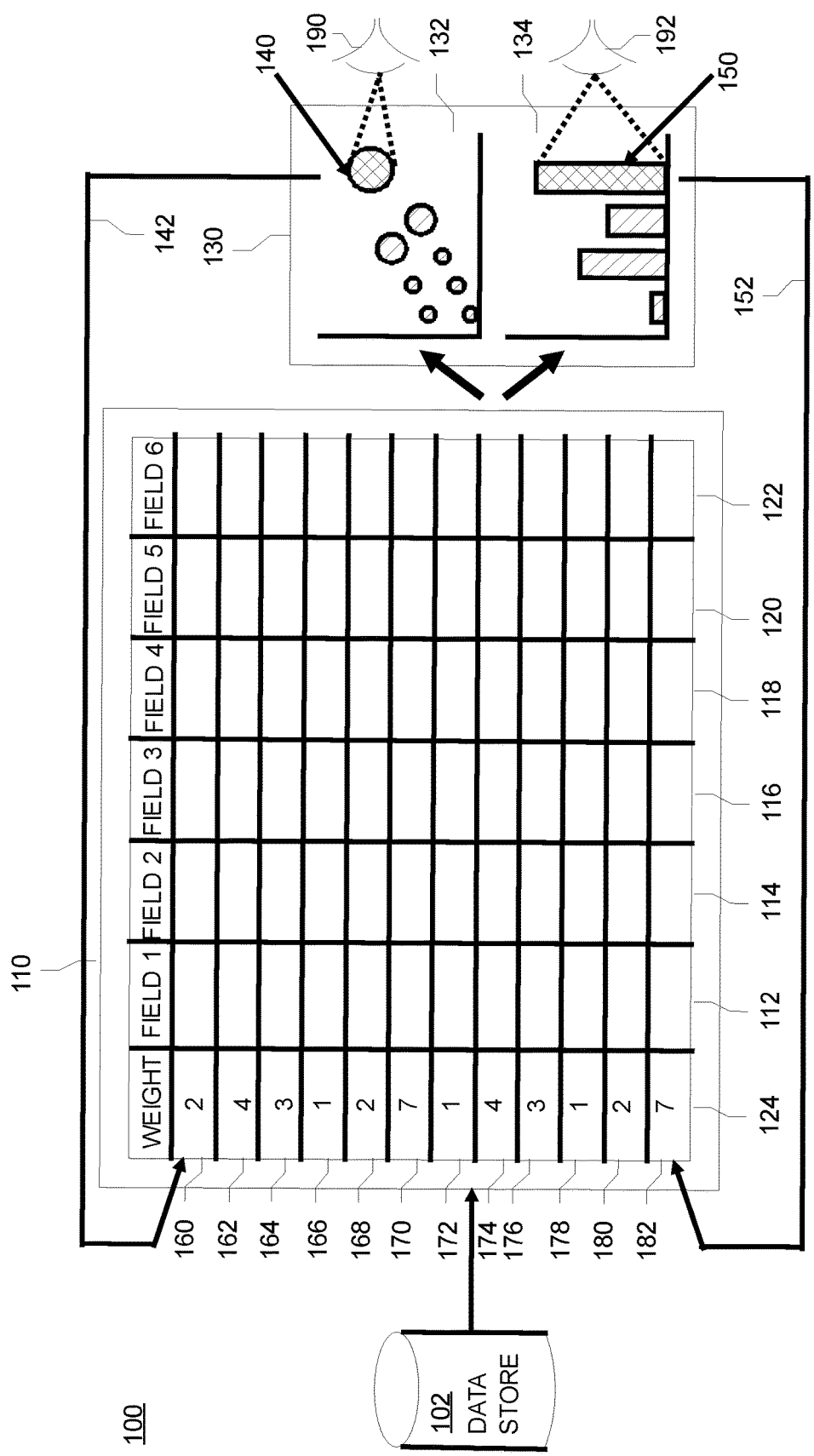
FIG. 1 is a schematic diagram of an embodiment according to the present invention for augmenting structured data.

Referring to FIG. 1 which is a schematic diagram of an embodiment 100 according to the present invention for augmenting structured data. Data store 102 stores structured data, the structured data comprising one or more data items. Examples of data store 102 include, but are not limited to, structured data stores 102 such as relational database management systems (RDBMS) or simple in memory object schemas and semi-structured data stores 102 such as MongoDB® (MongoDB and all MongoDB-based trademarks and logos are trademarks or registered trademarks of MongoDB, Inc and/or its affiliates) or CouchDB™ (CouchDB and all CouchDB-based trademarks and logos are trademarks or registered trademarks of Apache Software Foundation and/or its affiliates). An exemplary portion 110 of structured data is shown in FIG. 1. Exemplary portion 110 of structured data comprises a plurality of data items 160-182, each of the data items having a plurality of fields 112-122. Embodiments of the invention may have any number of data items 160-182 and may also have any number of fields 112-122. Exemplary portion 110 of structured data also comprises "WEIGHT" field 124 which will be described later with reference to FIG. 3.

Also shown in FIG. 1 are visualizations 130. A first visualization 132 may be viewed by a user 190. The first visualization 132 shows portions of the structured data 110 in the form of a balloon chart. A second visualization 134 may be viewed by a user 192. Users 190, 192 may be the same user or users 190, 192 may be different users. The second visualization 134 shows portions of the structured data 110 in the form of a bar chart. Embodiments of the invention may use any number of visualizations 132, 134 and may use any form of chart, not being limited to balloon or bar charts. Examples may include bar, stacked bar, 100% stacked bar, balloon, line, area, pie, Hi/Low/Close/Open, XY (Scatter), radar, mixed bar and line, doughnut and other types of charts. The visualizations 132, 134 may be provided by a visualization subsystem provided by the visualization capabilities available in many instances of commercial software, such as Watson Analytics® (Watson Analytics and all IBM Watson-based trademarks and logos are trademarks or registered trademarks of International Business Machines Corporation and/or its affiliates), Tableau® (Tableau and all Tableau-based trademarks and logos are trademarks or registered trademarks of Tableau Software and/or its affiliates), Essbase® (Essbase and all Essbase-based trademarks and logos are trademarks or registered trademarks of Oracle Corporation and/or its affiliates), Microsoft® Excel (Microsoft Excel and all Microsoft Excel-based trademarks and logos are trademarks or registered trademarks of Microsoft Corporation and/or its affiliates) and others.

Figure 2:
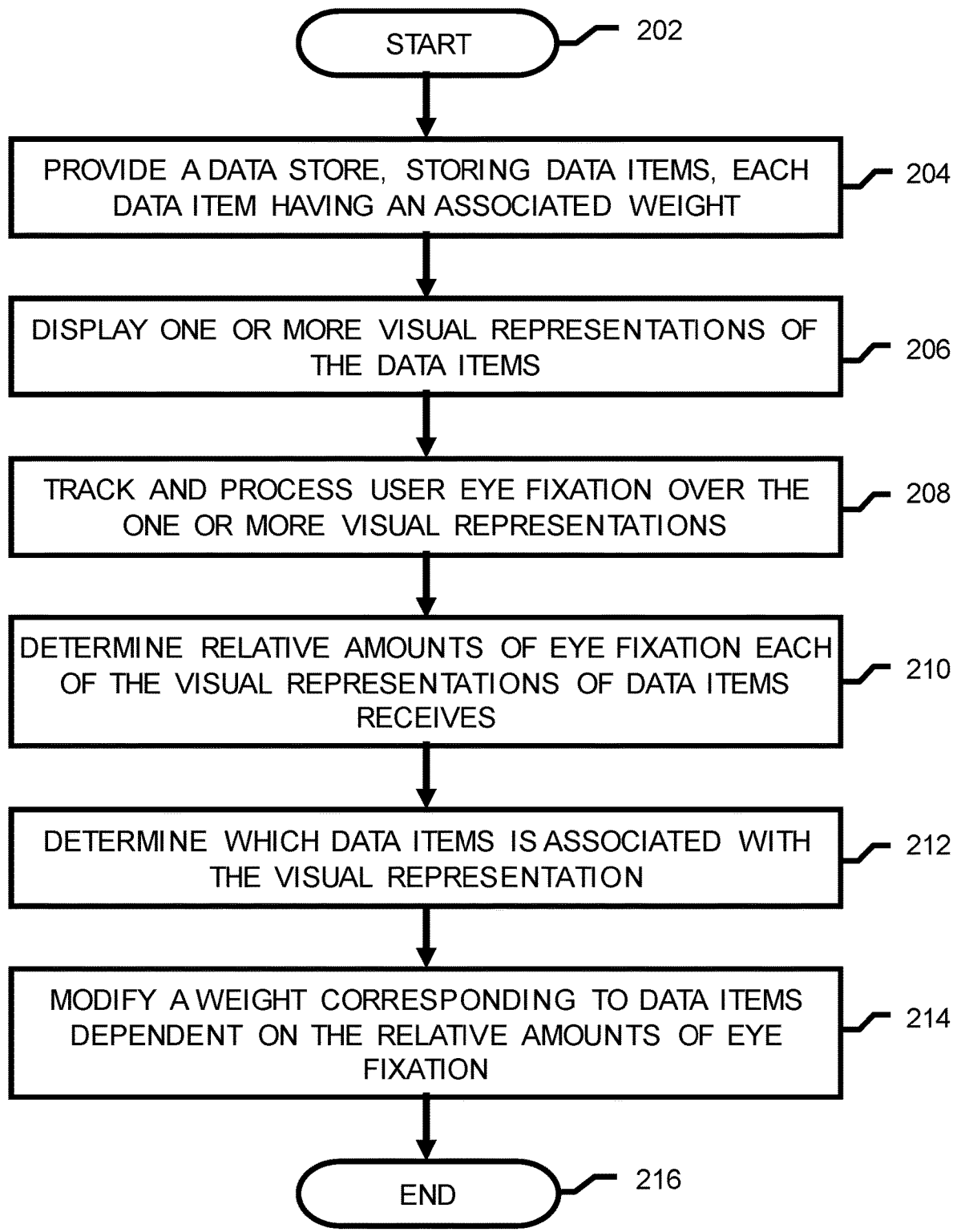
FIG. 2 is a flow diagram of an embodiment of a computer-implemented method according to the present invention for augmenting structured data.

FIG. 2 is a flow diagram of an embodiment of a computer-implemented method according to the present invention for augmenting structured data. Processing starts at step 202. At step 204, a data store 102 is provided. Data store 102 stores structured data, including exemplary portion 110 of structured data. Structured data comprises a first plurality of data items 160-182, each of the data items 160-182 having a plurality of fields 112-122. Each data item 160-182 also has an associated weight 124. The function and generation of the weight 124 will be described later with reference to step 214 of FIG. 2. In embodiments of the present invention, associated weight 124 may be defined at step 204 when the data store 102 is provided or associated weight 124 may be provided at step 214 of FIG. 2 when the value of the associated weight 124 is first modified. At step 206, one or more visualizations 132, 134 comprising visual representations 140, 150 of a second plurality, or subset, of the first plurality of data items 160-182 are displayed. Each visual representation 140, 150 in a visualization 132, 134 corresponds to at least one data item 160, 182. Each visualization 132, 134 may comprise visual representations 140, 150 of a second plurality of the first plurality of data items 160-182. The second plurality may comprise any number from two to the entirety of the first plurality of data items 160-182.

Referring now to FIG. 3, which shows the exemplary portion 110 of the structured data of FIG. 1. Exemplary portion 110 of structured data comprises a plurality of data items 160-182, which in this example, represent information about each of three products, product A, product B and product C in each of four seasons, spring, summer, fall and winter, all in the year 2017. This gives twelve data items 160-182, although embodiments of the present invention may be used with any number of items, such as, for example, similar data for the year 2016 or similar data for product D, product E and the like. Each of the data items has a plurality of fields 112-124, in this example, representing the year 112, the season 114, the product 116, the number of the product that was sold 118, the cost of the product 120 and the profit made on the product 122. WEIGHT field 124 will be described later with reference to step 214 of FIG. 2.

Figure 4:
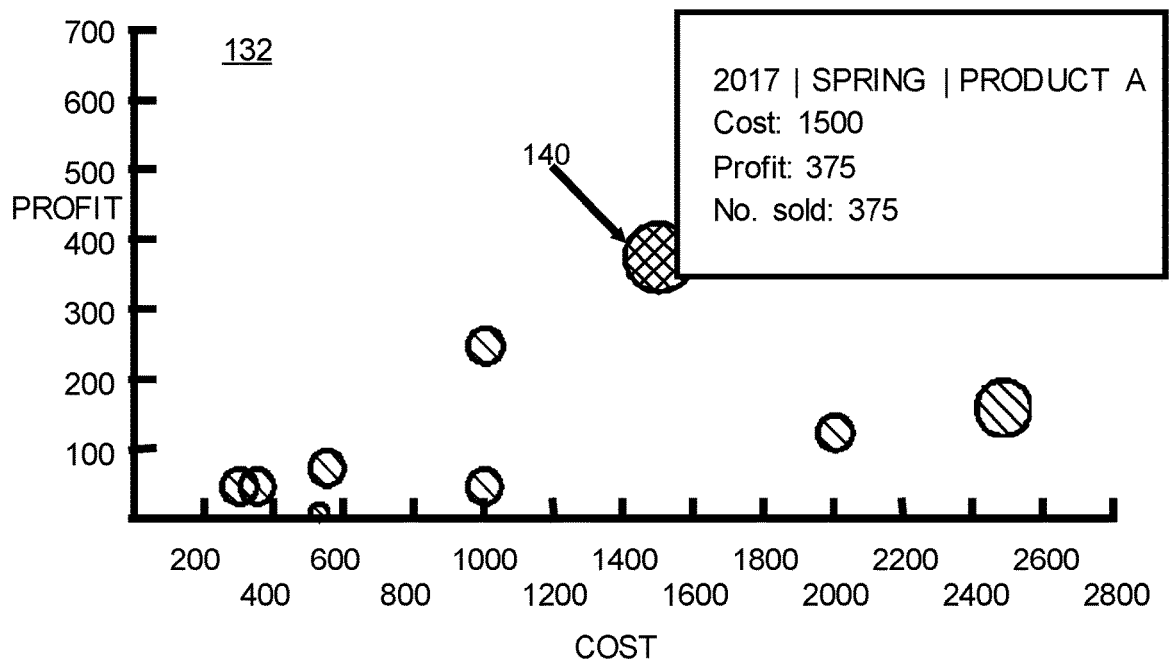
FIG. 4 is a first visualization of the embodiment of FIG. 1.

Referring now to FIG. 4, which is a first visualization 132 of the embodiment of FIG. 1. This is a balloon chart of the data items 160-182, with the vertical axis representing the PROFIT field 122 of a data item 160-182, the horizontal axis representing the COST field 120 of a data item 160-182 and the size of the balloon representing the PROD, or number of the product that was sold, field 118. Certain of the data items 160-182 of FIG. 3 are obscured behind others of the data items 160-182 of FIG. 3. One of the data items 160 of FIG. 3 is shown highlighted with the information about that data item displayed in a box.

Figure 5:
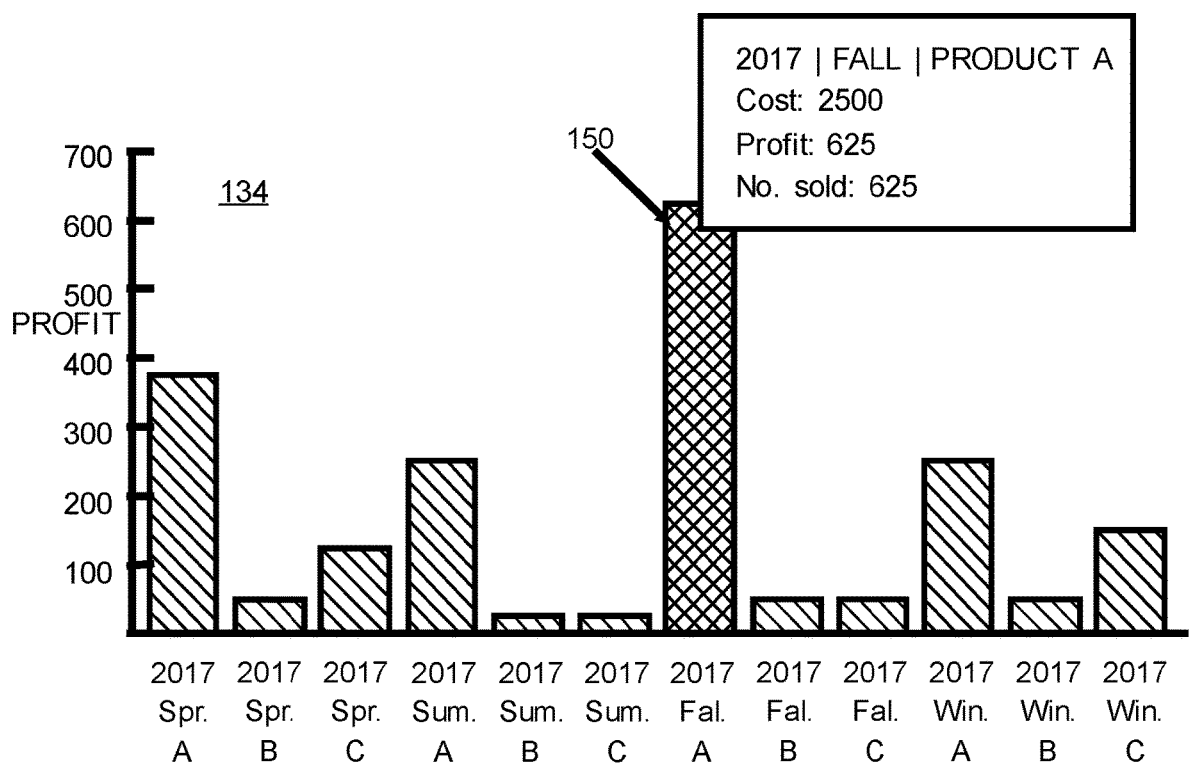
FIG. 5 is a second visualization of the embodiment of FIG. 1.

Referring now to FIG. 5, which is a second visualization 134 of the embodiment of FIG. 1. This is a bar chart of the data items 160-182, with the vertical axis representing the PROFIT field 122 of a data item 160-182 and the horizontal axis comprising the twelve different products. The COST field 120 of a data item 160-182 and the number of the product that was sold, field 118, are not shown in this second visualization 134. One of the data items 172 of FIG. 3 is shown highlighted with the information about that data item displayed in a box. Whilst the visualization 132 of FIG. 4 shows the PROFIT field 122, the COST field 120 and the PROD field 118 and the visualization 134 of FIG. 5 shows the PROFIT field 122 only, embodiments of the invention may show any number of fields in each visualization 132, 134. Further, whilst the visualization 132 of FIG. 4 is a balloon chart and the visualization 134 of FIG. 5 is a bar chart, embodiments of the invention may use any number and any kind of chart.

Returning to FIG. 2, at step 208, user 190, 192 eye fixation is tracked over the one or more visualizations 132, 134 to provide eye fixation data. Eye tracking systems are well known in the art and are used to determine which graphical item in a visualization 132, 134 a user 190, 192 is fixating on. Typically, such eye tracking systems are implemented using high resolution webcams coupled with high level gaze analysis software. Eye tracking data is typically produced by such systems and comprises indications of locations on the visualization 132, 134 where a user's 190, 192 gaze has stopped and further indications representing movement of the user's 190, 192 gaze between locations on the visualization 132, 134 where a user's 190, 192 gaze has stopped. Also at step 208, the user's 190, 192 eye fixation over the one or more visualizations 132, 134 is then processed to provide processed eye fixation data. Eye fixation data is typically produced by such systems and comprises indications typically having, when displayed, darker locations where the user's 190, 192 eyes were fixated more.

Returning to FIG. 2, at step 210, the relative amounts of eye fixation each visual representation 140, 150 in each of the visualizations 132, 134 receives is determined using the processed eye fixation data. In the example visualization 132 of FIG. 4, the visual representations 140 are each of the balloons in the chart and in the example visualization 134 of FIG. 5, the visual representations 150 are each of the bars in the chart.

At step 212, the data item 160-182 that is associated with each of the visual representations 140, 150 is determined. In the example visualization 132 of FIG. 4, the visual representation 140 is associated with data item 160 as can be seen in FIG. 1 by the arrow 142. In the example visualization 134 of FIG. 5, the visual representation 150 is associated with data item 182 as can be seen in FIG. 1 by the arrow 152.

At step 214, weights 124 corresponding to data items 160-182 are modified, dependent on the relative amounts of eye fixation each visual representation 140, 150 in each of the visualizations 132, 134 receives as was determined at step 210. For example, if a user's eye 190, 192 is fixated on visual representation 140 of the visualization 132 of FIG. 4, then the weight 124 of data item 160 is increased and if a user's eye 190, 192 is fixated on visual representation 150 of the visualization 134 of FIG. 5, then the weight 124 of data item 172 is increased. The weight 124 of data items 160-182 may be increased by applying any type of function that takes into account the original weight 124 and the new relative fixation level determined at step 210 above. It may be considered that the weight 124 associated with each data item represents "interestingness" on the part of the user 190, 192 or users 190, 192. As described with reference to step 204 above, in embodiments of the present invention, associated weight 124 may be defined at step 204 when the data store 102 is provided or associated weight 124 may be provided at step 214 of FIG. 2 when the value of the associated weight 124 is first modified. In the embodiment of FIG. 1 of the invention, associated weight 124 forms part of the data item 160-182 with which it is associated in the data store 102. In other embodiments, associated weight 124 may be an additional column within the structured data. In further embodiments, associated weight 124 may be an additional table within the structured data. In these embodiments, the associated weight 124 does not form part of the data item 160-182 in the data store 102.

Referring back to FIG. 3, the WEIGHT field 124 can be seen, with each data item 160-182 having a relative weighting. In the example of FIG. 3, it can be seen that data item 170, that is information relating to product C for the summer of 2017, has been fixated by a user more than the other data items. Processing ends at step 216.

Embodiments of the computer-implemented method described above provide a method of augmenting structured data by identifying interestingness of the data items in the structured data by tracking a user's gaze over potentially different visual representations of the structured data, and then using that tracked gaze data to identify a user's "interest" in the underlying data item. Items that attract higher user attention in a visualization are typically interesting because they are visually distinct, for example visual outliers, or abnormal values, or represent a data item that is of innate interest to the user.

In embodiments of the invention, the relative amounts of eye fixation each visual representation 140, 150 receives may be normalized across different visualization types in order to make it possible to compare different types of visualization 132, 134. For example, the same interest in data item 140 of FIG. 4 may result in a different relative amount of eye fixation to that of data item 150 of FIG. 5, even though the interest in each of the data items 140, 150 is the same, simply because the chart types displayed in the visualizations 132, 134 are different.

In embodiments of the invention, a single weight 124 per data item 160-182, aggregated over all users 190, 192 and all visualization 132, 134 types is stored. In other embodiments, weights 124 per user 190, 192 may be stored, weights 124 per session may be stored or weights 124 per visualization type may be stored, for example a first weight 124 for balloon charts 132 and a second weight 124 for bar charts 134. Other variations involving multiple weights 124 per data item 160-182 are possible.

Embodiments of the present invention augment structured data by the addition of a weight 124 which corresponds to the level of eye fixation on a visual representation 140, 150 of the data item 160-182 associated with that visual representation 140, 150. How that weight 124 is used does not form part of embodiments of the present invention. However, the weights 124 provided by embodiments of the present invention may be used in follow on processing of the structured data. For example, they may be used in statistical algorithms, such as determining that all the data items 160-182 which received a higher weighting are ones associated with North America, thus indicating an interest by the user 190, 192 in data items 160-182 associated with North America. Also for example, they may be used as a means of explicit filtering of data items, such as showing the top 50 of the most looked at data items 160-182, across all users 190, 192 or across any subset of users 190, 192. Further, for example, they may be used to generate suggestions of alternate projections or starting points for analysis based on the weight 124 associated with a data item 160-182. The examples above provide some indication as to what the weights 124 associated with data items 160-182 may be used for, but are not intended to provide any limitations as to their uses, which may be used with many different types of cognitive algorithms.

Figure 6:
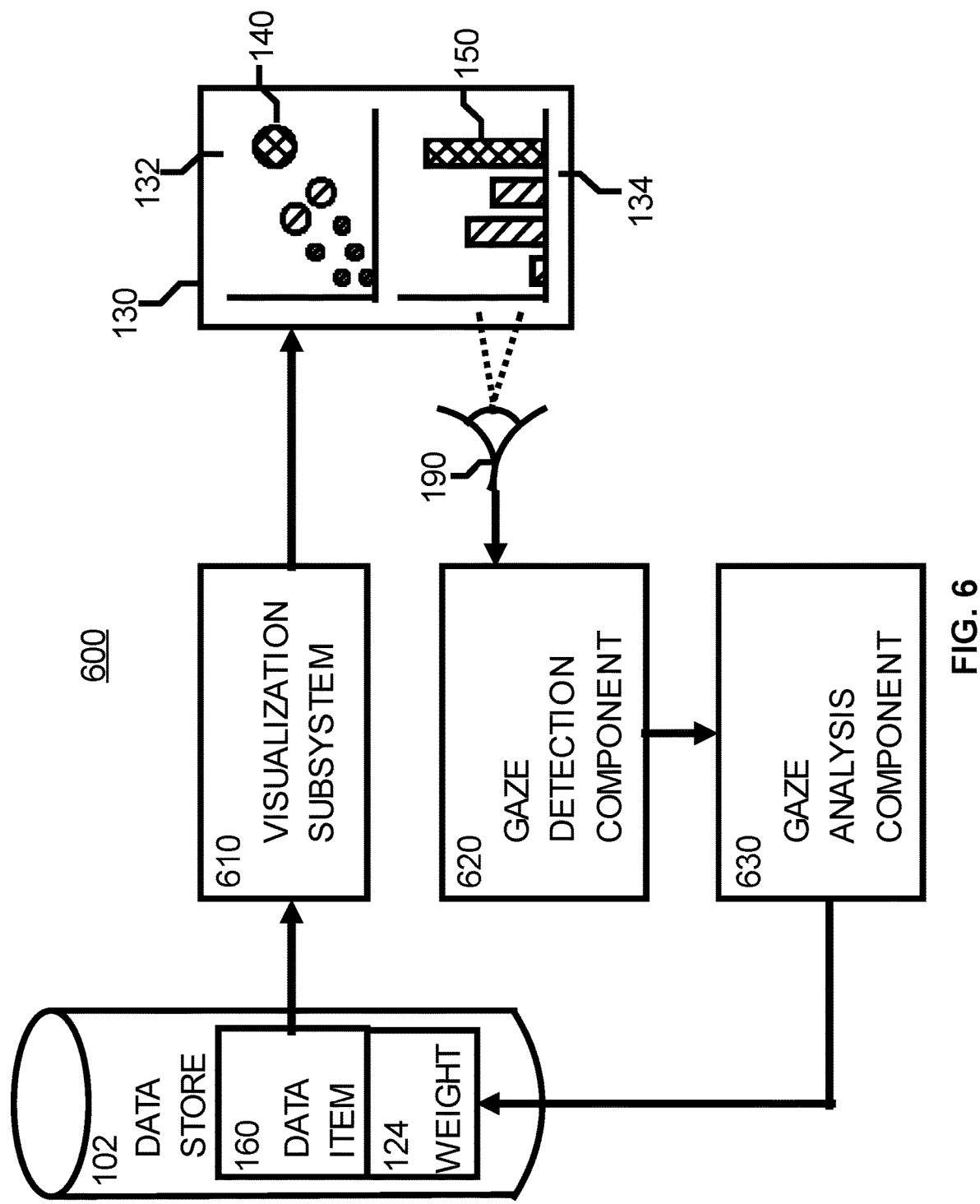
FIG. 6 is a block diagram of an embodiment of apparatus according to the present invention for augmenting structured data.

FIG. 6 is a block diagram of an embodiment of apparatus according to the present invention for augmenting structured data. The apparatus comprises a data store 102 which stores structured data, the structured data comprising data items 160-182, each of the data items 160-182 having an associated weight 124. Examples of data store 102 include, but are not limited to, structured data stores 102 such as relational database management systems (RDBMS) or simple in memory object schemas and semi-structured data stores 102 such as MongoDB® or CouchDB™.

A visualization subsystem 610 displays one or more visualizations 132, 134 comprising visual representations 140, 150 of some or all of the data items 160-182. A gaze detection component 620 tracks and processes user 190, 192 eye fixation over one or more of the visualizations 132, 134 to provide processed eye fixation data. The visualization subsystem 610 may be provided by the visualization capabilities available in many instances of commercial software, such as Watson Analytics®, Tableau®, Essbase®, Microsoft® Excel and others.

A gaze analysis component 630 determines, using the processed eye fixation data, relative amounts of eye fixation each of the visual representations 140, 150 in each of the visualizations 132, 134 receives. The gaze analysis component 630 determines which one of the data items 160-182 is associated with each of the visual representations 140, 150 of the data items 160-182. The gaze analysis component 630 modifies the associated weight 124 corresponding to the data items 160-182 dependent on the relative amounts of eye fixation.

Figure 7:
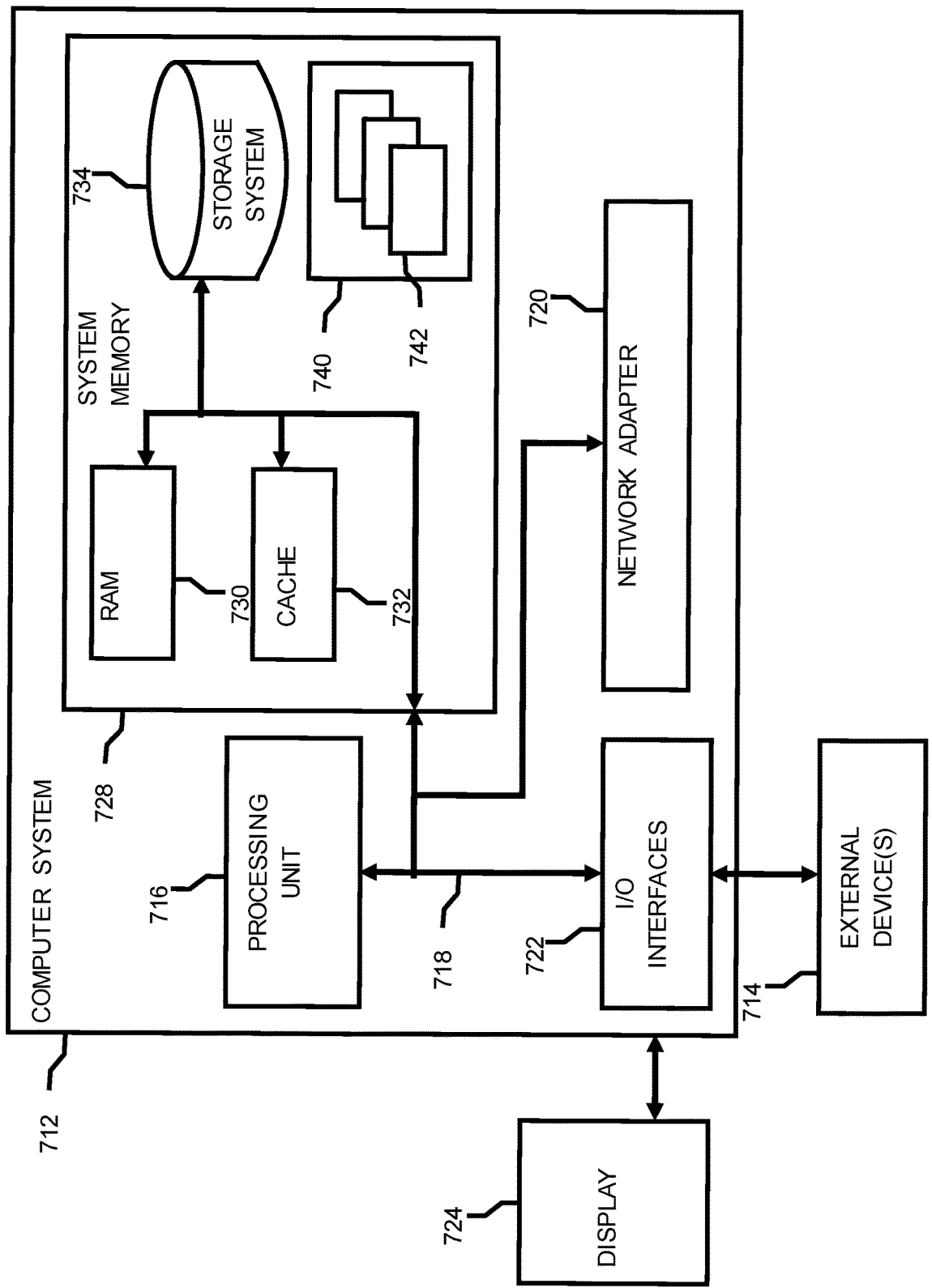
FIG. 7 is a computer system according to an embodiment of the present invention.

Referring now to FIG. 7, a schematic of an example of computing system is shown. Computing system 712 is only one example of a suitable computing system and is not intended to suggest any limitation as to the scope of use or functionality of embodiments of the invention described herein. Regardless, computing system 712 is capable of being implemented and/or performing any of the functionality set forth hereinabove.

Computer system/server 712 is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are conFigured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
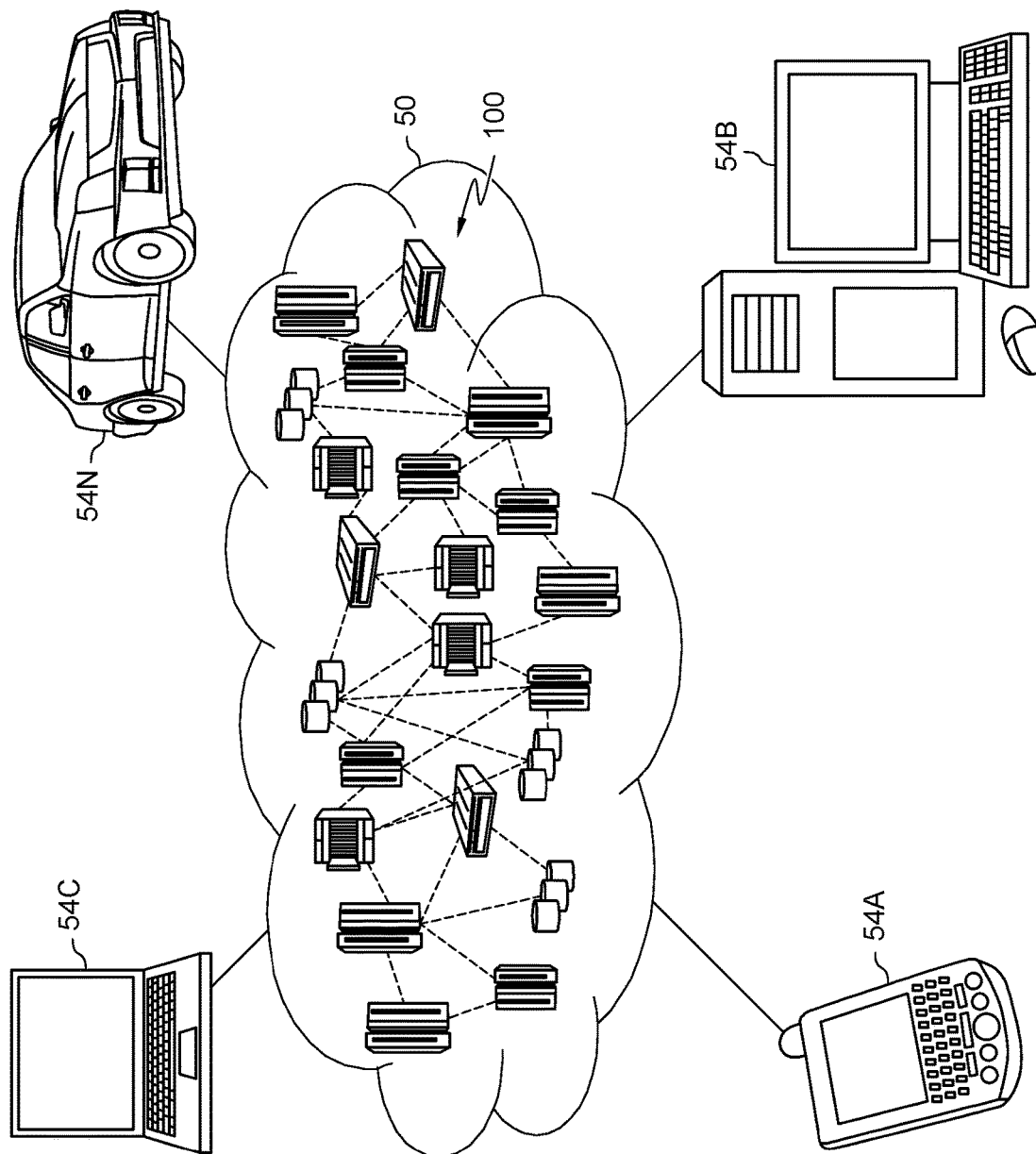
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 100 and cloud computing environment 50 can communicate with any type of computerized device over any type of network and/or network addressable connection (e.g., using a web browser).

Figure 9:
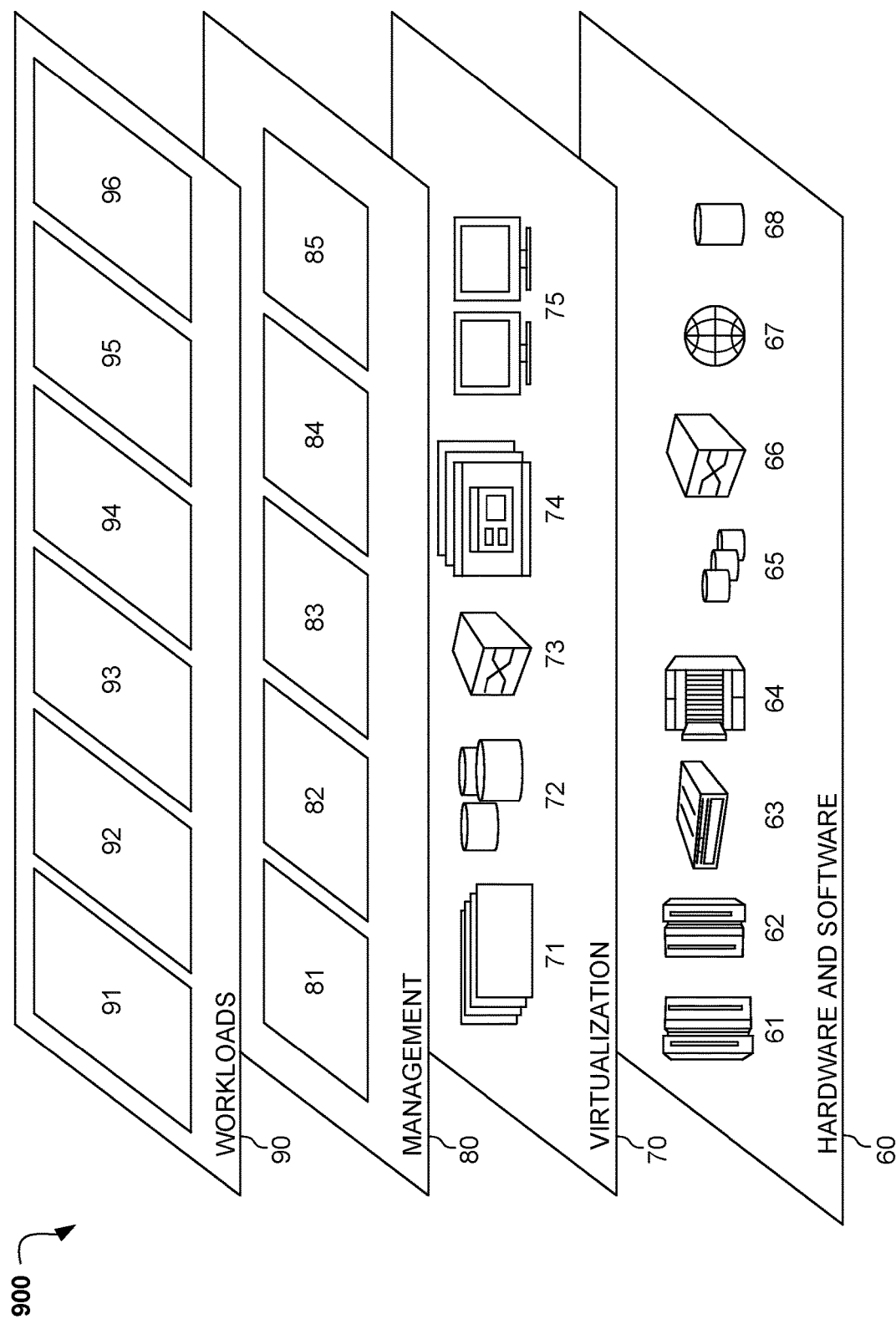
FIG. 9 depicts abstraction model layers according to an embodiment of the present invention.

Referring now to FIG. 9, a set of functional abstraction layers 900 provided by cloud computing environment 50 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmenting structured data processing 96. Augmenting structured data processing 96 may relate to augmenting structured data using input from an eye tracker by associating weight to the data that indicates data importance to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for augmenting structured data, comprising:
    providing a data store, said data store storing structured data, said structured data comprising a first plurality of data items, each of said first plurality of data items having an associated weight from a plurality of weights, wherein said plurality of weights is an additional column within said structured data;
    displaying one or more visualizations, said visualizations comprising visual representations of a second plurality of said first plurality of data items, wherein said second plurality of said first plurality of data items is a subset of said first plurality of data items;
    tracking and processing, using a webcam coupled with a gaze analysis software, a user eye fixation over said one or more visualizations to provide processed eye fixation data;
    determining, using said processed eye fixation data, relative amounts of eye fixation on each of said visual representations in each of said one or more visualizations, wherein said relative amounts of eye fixation is normalized across different types of said visualizations;
    determining which one of said first plurality of data items is associated with each of said visual representations of said second plurality of said first plurality of data items based on the determined relative amounts of eye fixation;
    modifying said associated weight corresponding to said one of said first plurality of data items dependent on said relative amounts of eye fixation, wherein said associated weight corresponding to said one of said first plurality of data items dependent on said relative amounts of eye fixation is modified based on a function that takes into account an original value of said associated weight and the determined relative amounts of eye fixation; and
    filtering said first plurality of data items based on said associated weight.

2. The computer-implemented method of claim 1, wherein a single weight is associated with each data item, aggregated over all users whose user eye fixation is tracked and processed.

3. The computer-implemented method of claim 1, wherein a weight is associated with each data item for each type of visualization.

4. The computer-implemented method of claim 1, wherein said visualizations comprising one or more of bar, stacked bar, 100% stacked bar, balloon, line, area, pie, Hi/Low/Close/Open, XY (Scatter), radar, mixed bar and line or doughnut.

5. An apparatus for augmenting structured data, comprising:
    a data store which stores structured data, said structured data comprising a first plurality of data items, each of said first plurality of data items having an associated weight from a plurality of weights, wherein said plurality of weights is an additional column within said structured data;
    a visualization subsystem displaying one or more visualizations, said visualizations comprising visual representations of a second plurality of said first plurality of data items, wherein said second plurality of said first plurality of data items is a subset of said first plurality of data items;
    a gaze detection component which tracks and processes, using a webcam coupled with a gaze analysis software, a user eye fixation over said one or more visualizations to provide processed eye fixation data;
    a gaze analysis component which:
        determines, using said processed eye fixation data, relative amounts of eye fixation each of said visual representations in each of said one or more visualizations receives, wherein said relative amounts of eye fixation is normalized across different types of said visualizations;
        determines which one of said first plurality of data items is associated with each of said visual representations of said second plurality of said first plurality of data items;
        modifies said associated weight corresponding to said one of said first plurality of data items dependent on said relative amounts of eye fixation, wherein said associated weight corresponding to said one of said first plurality of data items dependent on said relative amounts of eye fixation is modified based on a function that takes into account an original value of said associated weight and the determined relative amounts of eye fixation; and
        filters said first plurality of data items based on said associated weight.

6. The apparatus for augmenting structured data of claim 5, wherein said gaze analysis component normalizes said relative amounts of eye fixation each of said visual representations in each of said one or more visualizations receives across different types of said visualizations.

7. The apparatus for augmenting structured data of claim 5, wherein, in said data store, a single weight is associated with each data item, aggregated over all users whose user eye fixation is tracked and processed.

8. The apparatus for augmenting structured data of claim 5, wherein, in said data store, a weight is associated with each data item for each type of visualization.

9. The apparatus for augmenting structured data of claim 5, wherein said visualization subsystem displays visualizations comprising one or more of bar, stacked bar, 100% stacked bar, balloon, line, area, pie, Hi/Low/Close/Open, XY (Scatter), radar, mixed bar and line or doughnut.

10. A computer program product for augmenting structured data, the computer program product comprising:
a computer readable storage medium having program instructions embodied therewith, the program instructions executable by a computer to cause the computer to:
provide a data store, said data store storing structured data, said structured data comprising a first plurality of data items, each of said first plurality of data items having an associated weight from a plurality of weights, wherein said plurality of weights is an additional column within said structured data;
display one or more visualizations, said visualizations comprising visual representations of a second plurality of said first plurality of data items, wherein said second plurality of said first plurality of data items is a subset of said first plurality of data items;
track and process, using a webcam coupled with a gaze analysis software, a user eye fixation over said one or more visualizations to provide processed eye fixation data;
determine, using said processed eye fixation data, relative amounts of eye fixation on each of said visual representations in each of said one or more visualizations, wherein said relative amounts of eye fixation is normalized across different types of said visualizations;
determine which one of said first plurality of data items is associated with each of said visual representations of said second plurality of said first plurality of data items based on the determined relative amounts of eye fixation;
modify said associated weight corresponding to said one of said first plurality of data items dependent on said relative amounts of eye fixation, wherein said associated weight corresponding to said one of said first plurality of data items dependent on said relative amounts of eye fixation is modified based on a function that takes into account an original value of said associated weight and the determined relative amounts of eye fixation; and
filtering said first plurality of data items based on said associated weight.

11. The computer program product of claim 10, wherein a single weight is associated with each data item, aggregated over all users whose user eye fixation is tracked and processed.

12. The computer program product of claim 10, wherein a weight is associated with each data item for each type of visualization.

13. The computer program product of claim 10, wherein said visualizations comprising one or more of bar, stacked bar, 100% stacked bar, balloon, line, area, pie, Hi/Low/Close/Open, XY (Scatter), radar, mixed bar and line or doughnut.

* * * * *